United States Patent [19]
Riemscheid et al.

[11] Patent Number: 5,577,420
[45] Date of Patent: *Nov. 26, 1996

[54] CAM SHAFT FOR INTERNAL COMBUSTION ENGINE

[76] Inventors: Helmut Riemscheid, Heiligenstock 53, 5204 Lohmar 21; Karl Weiss, Kastanienweg 24, 5205 St. Augustin; Herbert Frielingsdorf, Südstrasse 50 a, 5204 Lohmar 1; Peter Amborn, In den Gärten 2, 5206 Neunkirchen-Seelscheid 1; Stefan Magirius, Holzgasse 27, 5300 Bonn; Klaus Greulich, Höhenring 61, 5357 Heimerzheim; Gretel Schmidt, Zur Wende 32, 5206 Neunkirchen; Peter Urban, Hospeitstrasse 42, 5000 Köln 30, all of Germany

[*] Notice: The portion of the term of this patent subsequent to Nov. 24, 2009, has been disclaimed.

[21] Appl. No.: 174,470

[22] Filed: Dec. 28, 1993

Related U.S. Application Data

[60] Continuation of Ser. No. 922,438, Jul. 29, 1992, abandoned, which is a division of Ser. No. 548,144, Jul. 3, 1990, Pat. No. 5,165,303.

[30] Foreign Application Priority Data

Jul. 4, 1989 [DE] Germany ............ 39 21 923.2
Dec. 22, 1989 [DE] Germany ............ 39 42 529.0

[51] Int. Cl.⁶ .................................. F16H 53/00
[52] U.S. Cl. ............................ 74/567; 123/30.6
[58] Field of Search ................ 74/567, 568 R, 74/569; 123/90.6, 90.27, 90.17, 90.18, 509, 495; 29/523

[56] References Cited

U.S. PATENT DOCUMENTS

| | | | |
|---|---|---|---|
| 4,388,897 | 6/1983 | Rosa | 123/90.60 |
| 4,949,683 | 8/1990 | Swars | 74/567 |
| 4,993,282 | 8/1991 | Swars | 74/567 |

FOREIGN PATENT DOCUMENTS

| | | | |
|---|---|---|---|
| 0254058 | 1/1988 | European Pat. Off. | 74/567 |
| 62-199910 | 9/1987 | Japan | 123/90.6 |
| 62-199907 | 9/1987 | Japan | 74/567 |
| 2133104 | 7/1984 | United Kingdom | 74/567 |

*Primary Examiner*—Vinh T. Luong
*Attorney, Agent, or Firm*—Harness, Dickey & Pierce

[57] ABSTRACT

A cam shaft for valve operation in an internal combustion engine comprises two shaft elements of which the first (101, 201) is disposed inside the second (102, 202) and can be moved relative thereto angularly and/or axially. First cam elements (107, 207) provided on the first shaft element have at least lobe portions which extend radially outwardly through slots in the second shaft element to provide a cam surface, while second cam elements are provided on the second shaft element. The first and/or the second shaft element may comprise a number of individual tubular sections joined to one another.

22 Claims, 2 Drawing Sheets

CAM SHAFT FOR INTERNAL COMBUSTION ENGINE

This is a continuation of U.S. patent application Ser. No. 922,438, filed Jul. 29, 1992, now abandoned which was a divisional of Ser. No. 548,144, filed Jul. 3, 1990 now U.S. Pat. No. 5,165,303.

BACKGROUND OF THE INVENTION

1. Field of the Invention

This invention relates to a cam shaft for an internal combustion engine, the cam shaft comprising two shaft elements of which one is disposed inside the other and which are capable of limited angular and/or axial movement relative to one another, so as to change the relationship between first cam elements connected to one of the shaft elements and second cam elements connected to the other shaft element.

Such a cam shaft is used in an internal combustion engine, with the inlet valves of the engine operated by the cam elements connected to one of the shaft elements and the exhaust valves of the engine operated by the cam elements connected to one of the shaft elements and the exhaust valves of the engine operated by the cam elements connected to the other shaft element, in order to obtain a variation in the overlap of the opening periods of the inlet and exhaust valves. It is known that for an engine operating under part load and low speed conditions, only a small overlap between the opening periods of the inlet and exhaust valves is desirable, whilst at higher speeds, gas dynamics dictate that a greater overlap is required. If the inlet valves and exhaust valves of an engine are operated by separate cam shafts, a change in the angular relationship between the cam shafts can readily be achieved by relatively simple measures, for example by operating on a driving belt by means of an adjusting device, to increase or decrease the operative length of the belt between the two cam shafts. This expedient is not, however, applicable to a simple engine which does not have two separate cam shafts, and hence the provision for adjustment of the relationship of the cams to one another, to give favourable engine performance at both high and low speeds, has to be provided within a single cam shaft.

2. Description of Prior Art

A cam shaft including two shaft elements disposed one within the other is disclosed in EP 0254058 A2. In this, cam elements associated with the inner shaft element have cylindrical bores which slide on the outer surface of the outer shaft element, and in the region of their base circles have single radially extending fixing bolts which reach through peripheral slots in the outer shaft element to connect to the inner shaft element. This type of fixing can result in deformation of the inner shaft element in the region of the fixing bolts, when the cam is under torque loading. Damage can result, and loss of exact control of the cam timing.

SUMMARY OF THE INVENTION

It is broadly the object of the present invention to provide a cam shaft of the type having inner and outer shaft elements, wherein a secure and angularly-true connection is provided between the inner shaft element and its associated cams.

According to the present invention, we provide a cam shaft for valve operation in an internal combustion engine, comprising a first shaft element and a second shaft element; said first shaft element being disposed within the second shaft element and being movable relative thereto; said first shaft element being provided with first cam elements of which at least lobe portions extend outwardly through slots in said second shaft element, and said second shaft element being provided with second cam elements.

In one embodiment of the invention, the second, outermost, shaft element may have peripherally extending slots of limited angular extent through which only the lobe portions of the first cam elements extend, said second shaft element having means providing base circle cam surfaces for said lobe portions of the first cam elements. The first cam elements may be of annular form and fit on entire circumferential regions of the first shaft element. The operative surface which is followed by a follower element engaged by the cam thus comprises the surface of the lobe portion of the first cam element, and a base circle region formed by the second shaft element or one or more additional elements connected thereto.

The first cam elements may be made with a cylindrical internal bore, within which the first shaft element fits directly with a brazed or welded or force-fitting connection provided between each cam element and the shaft element. It will be appreciated in this case that it is only the lobe portion of each first cam element which can be moved angularly relative to the second shaft element; the base circle surface which is followed by a cam follower does not move.

If the second, outer, shaft element encloses the first shaft element with a small clearance therebetween, protuberances are needed in the second shaft element to accommodate the cam elements on the first shaft element. In this case, these protuberances can themselves provide base circle running surfaces for the cams, whose lobes are provided by the first cam elements on the inner shaft element. To ensure a smooth transition from the base circles to the lobes, the protuberances can be continued as web portions on the peripherally directed edges of the slots in the second shaft element.

If the second shaft element has a significantly larger diameter than the first shaft element, such that all but the lobes of the cam elements on the first shaft element can be received within the normal diameter of the second shaft element, then annular members can be provided, secured to the external surface of the second shaft element adjacent the peripheral slots therein, to form the base circles of the operating surface of the first cams.

Preferably the first shaft element is a tubular body which extends throughout the cam shaft, and on which the first cam elements, of annular configuration, are fixed. One suitable method of securing the cams is that of locally expanding the first shaft element within its cams, by hydraulic means. Laser welding, done from the inside of the tubular shaft element with the aid of a mirror is also a possible known technique.

Alternatively, the first shaft element may be made up of individual sections joined together in the regions of the cam elements thereon by methods such as above referred to. A cam element can be integrally formed on each of such tubular sections.

The second, outer, shaft element must, in the case of a first shaft element which has its cam elements fixed to it, comprise individual tubular sections joined to one another in the region of the peripheral slots therein. It is possible for two of the second cam elements to be integral with a section of tube; this is also applicable in the case of any bearing journals which may be provided, of larger diameter than the tube sections. The preferred method for joining the parts to one another is laser welding, the sections of tube being flush with one another.

Manufacture of such a cam shaft is done by placing individual tubular sections of the second shaft element on one another in the required sequence, e.g. by an assembly device. Any separate cam elements for the second shaft element would previously have been mounted on the tube sections. The first cam elements, for connection to the first shaft element lying inside the second shaft element, would be placed in the peripheral slots in the second shaft element. The individual tube sections of the second shaft element can now be welded together. Any of the second cam elements not integral with individual tube sections may be welded to the corresponding tube sections or secured thereto by hydraulic expansion of the relevant tube sections. After completion of the second shaft element, the first shaft element can be inserted axially into the second shaft element and the first cam elements therein. The first shaft element is then connected to the individual first cam elements after being suitably aligned, by welding or force locking by hydraulic expansion of the shaft element, as aforesaid. If the second tube element requires to be expanded to accommodate the first cam elements, this may be done by hydraulic expansion, in this case in a die, after which the peripheral slots through which the first cam elements extend must be milled in the shaft element.

In known manner, an adjusting device may be provided at one end of the cam shaft for adjusting the angular relationship between the first and second shaft elements. The adjusting device may comprise an axially movable coupling element which is torsionally fast with one shaft element and has torsionally-adjusting engagement with the other shaft element, e.g. by a quick thread mechanism. For moving the coupling element axially, an hydraulic cylinder device may be provided. One of the two shaft elements, preferably a second, outer, one, may be provided with a driving pinion or pulley. Such an adjusting device may be omitted if each of the shaft elements has its own driving pinion or pulley, the drive mechanisms of which are basically in synchronism with one another but are adjustable with respect to the angular relationship therebetween.

In another embodiment, the second, outer, shaft element may comprise a number of individual tubular sections connected to one another and having, at their points of connection to one another, part-tubular portions separated by longitudinally extending slots, said part-tubular portions extending through axial slots of limited angular extent provided in the first cam elements. In this embodiment, the first cam elements can enclose the first shaft element so as to provide a secure connection, e.g. by a force fitting or welded or soldered connection. Preferably each first cam element has an annular inner portion and the axial slots therein are radially spaced from the inside surface of such inner portion, being spaced from one another by webs which support an outer portion of the cam element. This construction has the advantage that the first cam element engages the first shaft element over an uninterrupted circumferential surface, for improved security. However, it is possible for the axial slots in each first cam element to open into the interior aperture of the cam element, so that contact with the first shaft element is established over a number of circumferentially spaced webs only. In this case, the second shaft element need not have its diameter increased where the first cam elements are provided.

The first shaft element may comprise a tubular body which extends throughout the cam shaft and on which the first cam elements are fixed, e.g. by hydraulic expansion or laser welding as above referred to. However, it is also possible for the first shaft element to comprise individual sections joined together in the region of the cam elements provided thereon, as previously described. Once again, a cam element can be integrally formed on each of such sections of the first shaft element.

The second, outer, shaft element, which must comprise individual longitudinal sections joined to one another in the case where the first shaft element has its cam elements fixed to it, preferably has its sections joined to one another at the end of the part-tubular portions thereof separated by the longitudinally extending slots. The second cam elements can each be in one piece with one of the individual sections of the second shaft element. This is also the case for bearing journals where these are provided. Such bearing journals can be formed by symmetrical expansion of the tubular material. Laser welding is preferred as the method of joining the individual tubular sections to one another.

The two shaft elements may be arranged for their relative angular movement such that they are radially guided relative to one another at least at their ends and preferably in the region of any intermediate bearing journals. Provision may be made for a supply of lubricating oil here.

This embodiment of cam shaft may be assembled in the following way. If the second cam elements are not integral with the respective individual tubular sections of the second shaft element, they are to be connected to the corresponding sections before they are joined to one another, e.g. by hydraulic expansion of the tubular sections. Following that, the individual sections of the second shaft element are placed together in the required sequence and at the same time the first cam elements are positioned where they are joined, with the part-tubular portions of the sections extending through the axial slots in the first cam elements. The individual sections of the second shaft element are now able to be joined together, for example by welding. After completion of this, the first shaft element can be inserted axially into the first cam elements, and connected thereto, after suitable alignment, for example by expansion of the first shaft element by hydraulic pressure. Instead of the establishment of such a force fitting connection, laser welding may be carried out from the inside of the tubular shaft element, with the aid of a mirror. This last named method could be done before connection of the individual sections of the second shaft element to one another, but they should, however, firstly be firmly connected to the second cam elements.

In known manner, an adjusting device may be provided at one end of the cam shaft, to cause a change in the position of the two shaft elements relative to one another, to alter the timing of the two groups of cam elements relative to one another.

In a first embodiment, this change of position can occur in the form of relative angular movement between the two shaft elements. In this case, the axial slots in the first cam elements must have a circumferential extent greater than that of the part-tubular portions of the second shaft element which extend through them.

In a second embodiment, which could be combined with the first, a relative axial displacement of the shaft elements could be arranged to be effected. In this case, the first and/or the second cam elements should have a cam form which changes axially as well as circumferentially, and the lengths of the longitudinally extending slots provided between the part-tubular portions of the second shaft element sections must be longer than the axial dimension of the first cam elements having the axial slots.

BRIEF DESCRIPTION OF DRAWINGS

The invention will now be described by way of example with reference to the accompanying drawings, of which.

DESCRIPTION OF PREFERRED EMBODIMENTS

Figure 1:
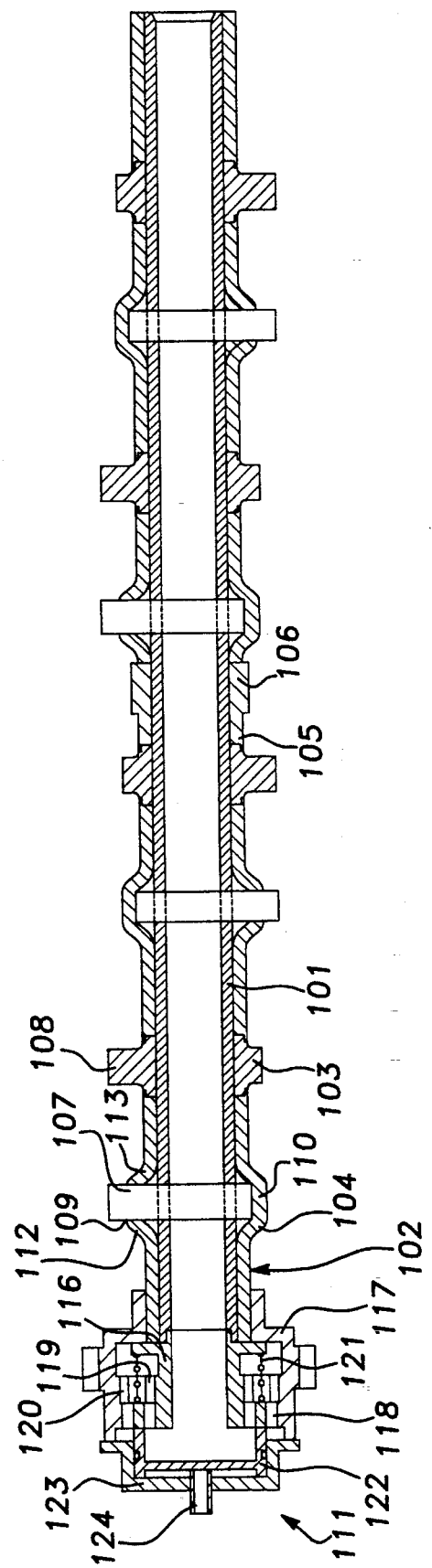
FIG. 1 is a longitudinal section through a first embodiment of cam shaft according to the invention.

Referring firstly to FIG. 1, the cam shaft there shown comprises a first tubular shaft element 101 lying within a second tubular shaft element 102. The first, inner, shaft element 101 extends throughout the length of the cam shaft, and has first cam elements 107 thereon, secured by any of the means above described.

The second, outer, shaft element 102 comprises a number of individual tubular longitudinally extending sections joined to one another. These comprise sections 103 which are each formed or provided with a cam element 108, sections 104 in each of which a peripherally extending slot 109 is provided, and sections 105 which are each integrally formed with a bearing journal 106.

Each of the first cam elements 107 has a lobe portion 130 which extends radially outwardly through the associated slot 109 in section 104. Where the slot 109 is provided, each section 104 is expanded to a protuberance 110. If such expansion is carried out by internal hydraulic pressure, then the expansion must be performed before the slot 109 is cut, e.g. by use of a milling cutter. The protuberance 110 continues as webs 112, 113 adjacent where the lobe portions of the cam element 107 extend from the slot 109, to form a part of the cam track which is followed by a cam follower when the cam shaft is in use. Thus the protuberance 110 forms a base circle part of the cam track, whilst the webs 112, 113 form transitional regions leading to the lobe portion of cam element 107.

The two shaft elements are movable angularly relative to one another about the rotational axis of the shaft. An adjusting device is provided for effecting such relative angular movement, the device being indicated generally at 111. It comprises an inner body 116 which is connected to the first shaft element 101, and an outer sleeve 117 connected to the second shaft element 102. A coupling element 118 is in engagement with external teeth 119 on the inner body 116, and with internal teeth 120 of the outer sleeve 117. One of the two sets of teeth 119, 120 comprises axial teeth, while the other comprises helical teeth. The coupling element 118 is movable axially, being supported by a spring 121 relative to the inner body 116 and being urgeable in the opposite direction, against the spring force, by a piston 122 movable in an hydraulic cylinder 123 and able to be subjected to pressure by an oil supply line 124.

Figure 2:
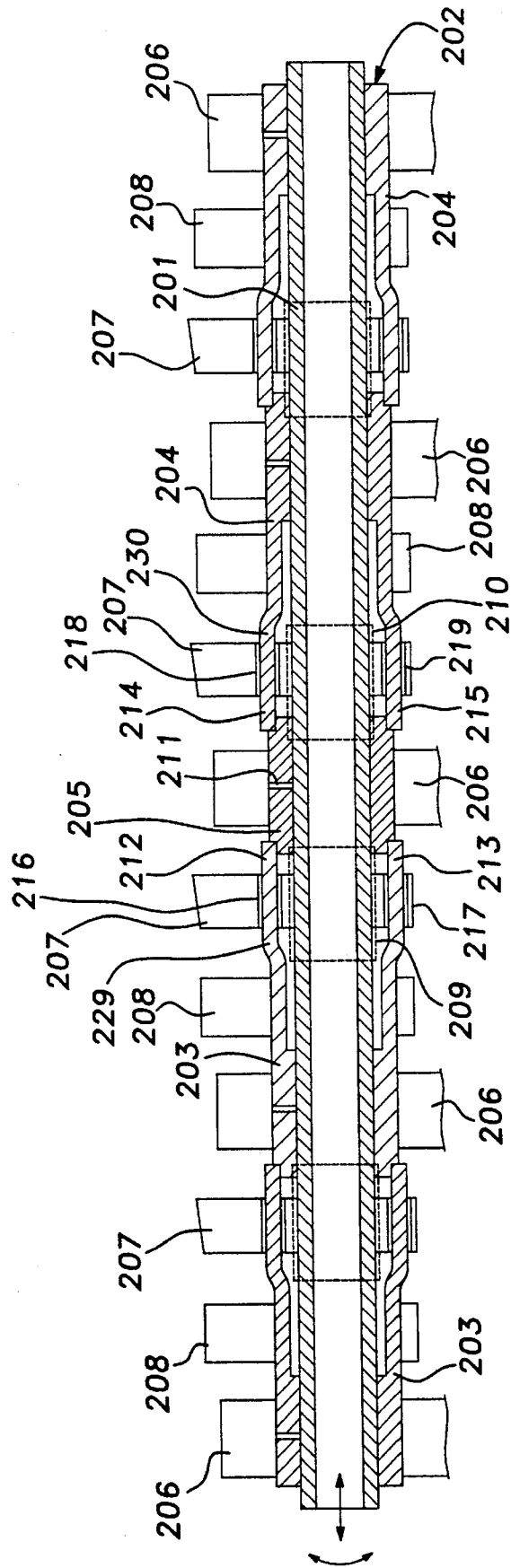
FIG. 2 is a longitudinal section through a further embodiment of cam shaft according to the invention.

FIG. 2 shows another embodiment of cam shaft comprising a first, inner, shaft element 201 and a second, outer, shaft element 202. These two shaft elements are able to be moved angularly and/or axially relative to one another about the axis of rotation of the cam shaft. An adjusting device for effecting such relative movement is not shown.

The second, outer, shaft element 202 comprises a number of individual tubular sections secured to one another. There are first sections 203, provided at their ends with longitudinal slots 209 leaving part-tubular portions therebetween, second sections 204 provided at their ends with longitudinal slots 210 and symmetrical to the first sections, and a third section 205. Each of the sections 203, 204, 205 is supported by a respective bearing 206 within which runs a journal portion of the section.

Where the sections 203, 204 are provided with their longitudinal slots 209, 210, the sections are of increased diameter so that between the slots part cylindrical tubular portions 212, 213, 214, 215 remain, spaced from the first shaft element 201. The inner shaft element 201 carries first cam elements 207 at these positions, and as most clearly seen in FIG. 3 the part-tubular portions 212, 213 of the second shaft element extend through axial slots 216, 217, 218, 219 in the cam elements. The circumferential extent of each of the slots in the cam elements is greater than the circumferential extent of each of the part-cylindrical portions 212, 213, 214, 215 of the sections of the second shaft element, so that the first shaft element and first cam elements thereon are able to move angularly relative to the second shaft element through an angle indicated as α.

The sections of the second shaft element have second cam elements 208 fixed thereon by any of the means aforesaid.

In FIG. 2, the first cam elements 207 are shown as three-dimensional cams. The axial length of the slots 209, 210 is greater than the thickness (dimension in the axial direction) of the cam elements 207, so that the first shaft element and cam elements thereon is also able to move axially relative to the second shaft element and its cam elements. Whatever form of adjustment mechanism is provided at the end of the cam shaft assembly should be able to provide this relative movement as well as the angular movement as above described.

Also shown in FIG. 2 is the provision in the sections of the second shaft element of oil holes 211 in the region of the bearings 206. The oil supply for such bearings also provides for lubrication of the shaft elements for their movement relative to one another.

Figure 4:
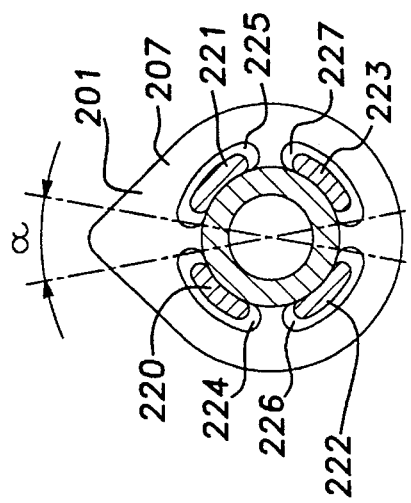
FIG. 4 is a transverse section showing a modification of the cam shaft of FIGS. 2 and 3.
Figure 3:
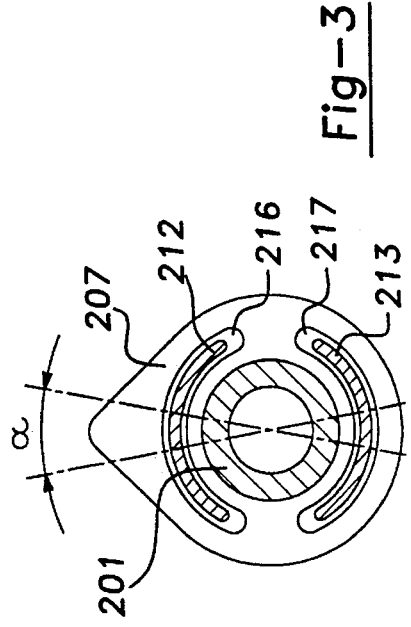
FIG. 3 is a transverse section through part of the cam shaft of FIG. 2.

In FIG. 3 the illustrated form of the first cam element 207 has a complete annular inner portion separated by webs from an outer portion of the cam element. This provides a large contact area with the first shaft element 201. In the cam element 207 shown in FIG. 4, there is no such annular inner portion; the outer surface of the inner shaft element 201 is engaged by webs provided between axial slots 224, 225, 226, 227 which extend through the cam element and in which the part-tubular portions 220, 221, 222, 223 of the section of the outer shaft element extend. Again a circumferential clearance is shown between the portions of the shaft section and the slots in the cam element, to permit relative movement through an angle α therebetween. In this embodiment, the section of the outer shaft element need not be expanded to provide a clearance from the inner shaft element.

If the two shaft elements are able to move axially relative to one another, they need not be angularly relatively movable. This causes the rotational rigidity of the second shaft element 202 to increase, the latter being able to derive some support from the elements provided on the first shaft element.

We claim:

1. A cam shaft for valve operation in an internal combustion engine, comprising a first shaft element;

a second shaft element;

said first shaft element being disposed within said second shaft element and being movable relative thereto;

first cam elements provided on said first shaft element, said first cam elements including lobe portions;

slots provided in said second shaft element, through which at least said lobe portions of said first cam elements extend;

and second cam elements provided on said second shaft element.

2. A cam shaft according to claim 1 wherein said first cam elements comprise annular elements individually fixed on the first shaft element.

3. A cam shaft according to claim 2 wherein said first shaft element comprises a tubular body which extends throughout the cam shaft.

4. A cam shaft according to claim 1 wherein said first cam elements have a force-fitting connection to the first shaft element.

5. A cam shaft according to claim 1 wherein the first cam elements have a welded or brazed connection to the first shaft element.

6. A cam shaft according to claim 1 wherein said second shaft element comprises a number of individual tubular sections joined to one another.

7. A cam shaft according to claim 6 wherein said second cam elements are integral with said tubular sections of the second shaft element.

8. A cam shaft according to claim 7 wherein bearing journals are integral with said tubular sections of the second shaft element.

9. A cam shaft according to claim 8 wherein said tubular sections of the second shaft element are welded flush with one another.

10. A cam shaft according to claim 1 further comprising an adjusting device at one end of the cam shaft, torsionally fast with one shaft element and having torsionally-adjusting engagement with the other shaft element.

11. A cam shaft according to claim 1 wherein said second shaft element comprises a number of individual tubular sections connected to one another and having, at their points of connection to one another, part-tubular portions separated by said slots, said part-tubular portions extending through axial slots of limited angular extent provided in said first cam elements.

12. A cam shaft according to claim 11 wherein said part-tubular portions of said sections of the second shaft element fit over the adjacent tubular section.

13. A cam shaft according to claim 11 wherein each of said tubular sections of the second shaft element comprises two of said part-tubular portions extending through the axial slots in the first cam elements.

14. A cam shaft according to claim 13 wherein said axial slots in the first cam elements are radially spaced from an internal surface of an inner portion thereof.

15. A cam shaft according to claim 11 wherein said first shaft element comprises a tubular body extending throughout the cam shaft.

16. A cam shaft according to claim 11 wherein said second cam elements are connected to the second shaft element by force fitting or welding or brazing.

17. A cam shaft according to claim 11 wherein said second cam elements are integral with said sections of the second shaft element.

18. A cam shaft according to claim 11 wherein bearing journals are integral with said sections of the second shaft element.

19. A cam shaft according to claim 11 wherein said tubular sections of the second shaft element are connected to one another by force fitting, welding or brazing.

20. A cam shaft according to claim 11 wherein said axial slots in the first cam elements have a circumferential extent greater than that of the part-tubular portions of the second shaft element which extend through said axial slots, and an adjusting device is provided for effecting relative angular movement between the two shaft elements.

21. A cam shaft according to claim 11 wherein cam elements on one of the shaft elements have a cam form which changes axially as well as circumferentially, and wherein an adjusting device is provided for effecting relative axial movement between the two shaft elements.

22. A cam shaft according to claim 11 wherein said axial slots in the first cam elements open into interior apertures thereof.

* * * * *